(No Model.)
J. F. RAY.
ELECTRIC METER.
No. 306,957. Patented Oct. 21, 1884.
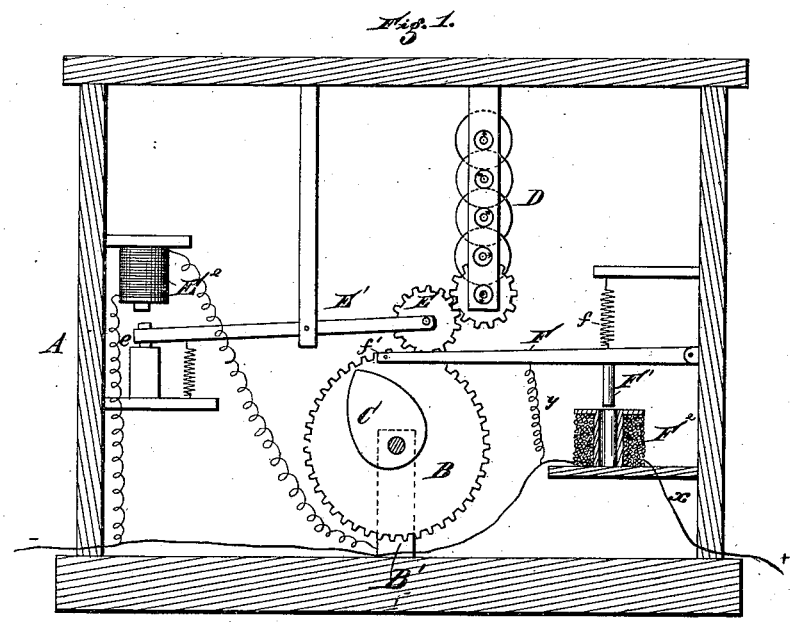
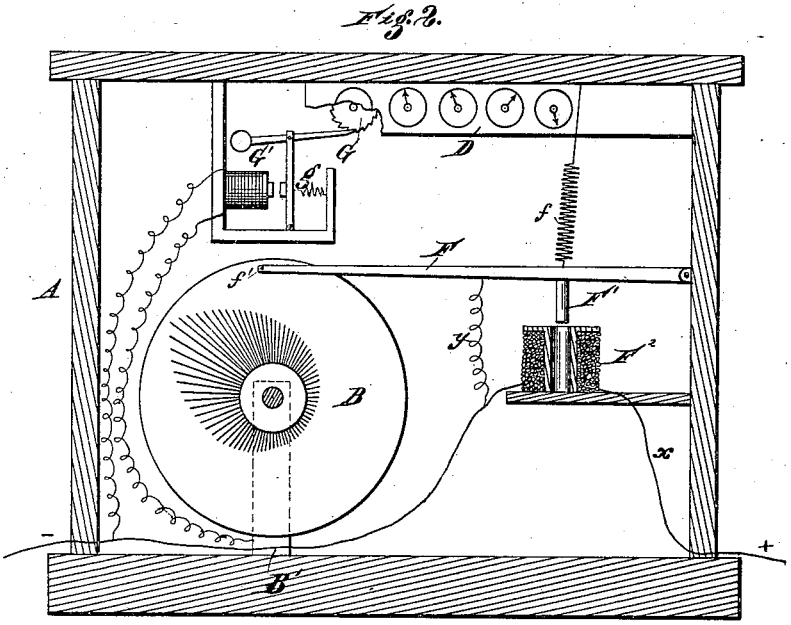
WITNESSES
INVENTOR
Attorney

UNITED STATES PATENT OFFICE.

JAMES F. RAY, OF DETROIT, MICHIGAN.

ELECTRIC METER.

SPECIFICATION forming part of Letters Patent No. 306,957, dated October 21, 1884.

Application filed December 11, 1883. (No model.)

*To all whom it may concern:*

Be it known that I, JAMES F. RAY, of Detroit, county of Wayne, State of Michigan, have invented a new and useful Improvement in Electric Meters; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and more particularly pointed out in the claims.

In the drawings, Figure 1 is a side elevation of a device embodying my invention. Fig. 2 is a variation.

The object of my invention is to provide an improved electric meter to register currents of different degrees of intensity and the quantity of the current generated or passed over a given circuit.

I carry out my invention as follows:

A represents the case of the meter.

B is a wheel poised upon a shaft, B', which is connected with any suitable clock-work (not shown in the drawings) for giving it a steady and uniform motion. Any power may be used for this purpose.

C is a heart-shaped projection on the face of the wheel B.

D represents a series of meter-wheels of any usual construction.

E is a gear-wheel poised upon a lever, E', the opposite end of which, at $e$, is provided with an armature located within the magnetic action of a helix, $E^2$.

F is an arm supported by a spring, $f$, and provided with a core, F', within the influence of a helix, $F^2$. This arm F has at its extremity a contact-point, $f'$, which, during each revolution of the wheel B, comes into contact with the heart-shaped projection C upon the face of the wheel B when a current is passing over the circuit.

$x$ represents the main line, which transmits the current to be measured. This line embraces the helix $F^2$.

$y$ represents a shunt-circuit embracing the arm F, the wheel B, or at least its heart-shaped projection C, and the helix $E^2$.

The operation of the device will now be readily understood. As the current passes over the main line $x$ it excites the helix $F^2$, which operates by axial magnetism to draw down in a corresponding degree the arm F. Its contact-point $f$ will then cross the heart-shaped projection C at the corresponding distance from the center of the wheel B. As soon as the shunt-circuit is closed by this contact, the helix $E^2$ is excited and lifts the lever E', which throws the gear-wheel E into mesh with the wheel B, and so actuates the meter-wheels. As soon as the point rides off from the heart-shaped projection, the shunt-circuit is broken, the wheel E is thrown out of gear with the wheel B, and the meter-wheels are again quiet until the wheel B has again revolved about its axis; and if the current on the main line $x$ is of large quantity, there will be a correspondingly strong action in the helix $F^2$, and the arm F will be drawn farther down, causing the contact-point to ride across a correspondingly broader part of the heart-shaped projection C, and this in turn causes the wheel E to remain longer in gear with B, and continues the motion of the meter-wheels through a longer period of time on each revolution of the wheel B. It is thus seen that the heart-shaped projection C may be given such a shape as to cause the meter-wheels to register in fixed units of quantity the amount or quantity of electricity passing through the main line.

It is apparent that this device may be varied without departing from the principles of my invention. For instance, in Fig. 2 the meter-wheels are represented as actuated by a pawl, G, and spring $g$, the pawl itself brought back into a new ratchet by the action of a helix, G'. So, also, the heart-shaped projection in Fig. 2 is represented as a series of projecting ribs, which ride past the contact-point, causing an impulse in the helix G' as each rib makes contact with the contact-point $f'$. In this latter case the quantity of current passing over the main line during one revolution would be indicated by the number of contacts made in crossing the heart-shaped projection.

I would have it understood that my invention contemplates, broadly, the employment, in an electric meter, of a uniformly-moving contact-surface of varying breadth, and a contact-point caused to measure the current and register the corresponding quantity passing over the line by the length of its contact with the contact-surface.

In the following claims I would have it understood that by the term "contact-maker" I include either the heart-shaped surface shown in Fig. 1, or a number of disconnected contact-points formed by the terminal faces of radial ribs, as shown in Fig. 2.

What I claim is—

1. In an electric-meter graduated registering mechanism, an independent contact-maker of variable breadth, with means for giving it a regular motion, a contact-point governed by one or more helices, which operate to make the contact at a narrower or broader portion of the contact-surface proportionately as the current to be measured is less or greater, and means for communicating motion to said registering mechanism during the period of the contact.

2. In an electric-meter graduated registering mechanism, a contact-maker and mechanism for causing it to move at a regular rate, an intermediate connection between said registering mechanism and said contact-surface, a portion of said intermediate connection constituting a part of a shunt or local circuit, including mechanism which operates to force and hold it in gear during the period the circuit is closed by said contact-surface.

3. In an electric-meter graduated registering mechanism, a contact-maker and mechanism for causing it to move at a regular rate, an intermediate connection between said registering mechanism and said contact-surface, a portion of said intermediate connection constituting a part of a shunt or local circuit, including mechanism which operates to force and hold it in gear during the period the circuit is closed by said contact-surface, said contact-surface being of graduated breadth, and in combination therewith a contact point located in the shunt or local circuit and governed by the current to be measured, whereby the contact is maintained a greater or less period, dependent on a greater or less quantity of current to be measured.

In testimony whereof I sign this specification in the presence of two witnesses.

JAMES F. RAY.

Witnesses:
N. S. WRIGHT,
M. B. O'DOGHERTY.